United States Patent
Cho et al.

(10) Patent No.: US 11,331,977 B2
(45) Date of Patent: May 17, 2022

(54) COOLING SYSTEM CONTROL METHOD FOR AUTONOMOUS DRIVING CONTROLLER

(71) Applicants: Hyundai Motor Company, Seoul (KR); Kia Motors Corporation, Seoul (KR)

(72) Inventors: Wan Je Cho, Hwaseong-si (KR); Jae Yeon Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/990,146

(22) Filed: Aug. 11, 2020

(65) Prior Publication Data
US 2021/0331552 A1 Oct. 28, 2021

(30) Foreign Application Priority Data

Apr. 28, 2020 (KR) .......................... 10-2020-0051402

(51) Int. Cl.
*B60H 1/00* (2006.01)
*B60H 1/32* (2006.01)

(52) U.S. Cl.
CPC ..... *B60H 1/00271* (2013.01); *B60H 1/00357* (2013.01); *B60H 1/00485* (2013.01); *B60H 1/00807* (2013.01); *B60H 1/00885* (2013.01); *B60H 1/3205* (2013.01); *B60H 1/3227* (2013.01); *B60H 1/3228* (2019.05); *B60H 2001/00307* (2013.01); *B60H 2001/3272* (2013.01); *B60H 2001/3285* (2013.01)

(58) Field of Classification Search
CPC ............ B60H 1/00271; B60H 1/00357; B60H 1/3227; B60H 2001/3285; B60H 1/3228; B60H 1/3205; B60H 2001/00307; B60H 2001/3272
See application file for complete search history.

(56) References Cited

U.S. PATENT DOCUMENTS

| | | | | |
|---|---|---|---|---|
| 2012/0183815 | A1* | 7/2012 | Johnston | B60K 11/02 429/50 |
| 2013/0074525 | A1* | 3/2013 | Johnston | B60H 1/00385 62/56 |
| 2013/0298583 | A1* | 11/2013 | O'Donnell | B60H 1/143 62/115 |
| 2017/0274727 | A1* | 9/2017 | Tasiopoulos | B60H 1/00921 |
| 2017/0309976 | A1* | 10/2017 | Lambert | H01M 10/486 |
| 2021/0221199 | A1* | 7/2021 | Lee | B60W 50/02 |

* cited by examiner

*Primary Examiner* — Lionel Nouketcha
(74) *Attorney, Agent, or Firm* — Morgan, Lewis & Bockius LLP

(57) ABSTRACT

A cooling system control method for an autonomous driving controller may include detecting the temperature of the autonomous driving controller by the controller when a vehicle is driving; determining whether a current temperature of the autonomous driving controller is lower than a target temperature by the controller; and terminating the controlling of the cooling system if the condition is satisfied in determining whether the current temperature of the autonomous driving controller is lower than the target temperature.

15 Claims, 2 Drawing Sheets

COOLING SYSTEM CONTROL METHOD FOR AUTONOMOUS DRIVING CONTROLLER

CROSS-REFERENCE TO RELATED APPLICATION

The present application claims priority to Korean Patent Application No. 10-2020-0051402 filed on Apr. 28, 2020, the entire contents of which is incorporated herein for all purposes by this reference.

BACKGROUND OF THE INVENTION

Field of the Invention

The present invention relates to a cooling system control method for an autonomous driving controller. More particularly, the present invention relates to a cooling system control method for an autonomous driving controller configured for efficiently controlling an autonomous driving controller in communication with an air-conditioning system in an autonomous vehicle.

Description of Related Art

In general, an air-conditioning system to control an indoor temperature of a vehicle is provided in the vehicle.

The air-conditioning system maintains an internal temperature of the vehicle at an appropriate temperature regardless of a change in an outside temperature and maintains a pleasant internal environment, and is configured to heat or cool the internal place of the vehicle by heat exchange by an evaporator in a process in which a refrigerant discharged by driving a compressor passes through the condenser, a receiver drier, an expansion valve, and an evaporator and is then circulated to the compressor again.

That is, in a cooling mode in summer, in the air conditioning system, a high-temperature and high-pressure gas phase refrigerant compressed by the compressor is condensed through the condenser and then is evaporated in the evaporator through the receiver drier and the expansion valve to decrease an internal temperature and humidity.

On the other hand, development of an autonomous vehicle has recently been required, and a radar, a Light Detection and Ranging (LiDAR), a GPS, etc. required for autonomous driving, various sensors, and a control device controlling them are mounted in a trunk of the vehicle.

However, in the above-described autonomous vehicle, as a separate cooling system for cooling the control device of which a calorific value is relatively large is required along with the air-conditioning system for cooling or heating the interior of the vehicle, there are drawbacks that a cost increases and it is difficult to secure a space for mounting the cooling system inside the narrow vehicle.

Also, a size and a weight of a cooling module mounted in front of the vehicle are increased, and there is a problem that a layout of connection pipes supplying a refrigerant or a coolant to the air-conditioning system, the cooling system of the control device, and a battery cooling system is complicated inside the engine compartment.

And when the cooling system for the autonomous driving controller is coupled in series with the cooling system for the battery module, even if only one of the autonomous driving controller and the battery module needs cooling, as the autonomous driving controller and the battery module are simultaneously cooled, there are drawbacks in which the cooling of the autonomous driving controller or the battery module that requires cooling is not performed properly.

Furthermore, guaranteed temperatures of the coolant for cooling each cooling system are different from each other, but when cooling each cooling system coupled in series simultaneously, there is an adverse drawback in terms of power consumption because the cooling may be performed based on a system with a low guaranteed temperature.

When the cooling performance of the cooling system for the autonomous driving controller deteriorates, the autonomous driving controller may not be properly cooled, causing malfunctions or errors of operation performance, and also having a risk which is directly related to the safety of drivers and pedestrians.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a cooling system control method for an autonomous driving controller that heat-exchanges coolants in conjunction with an air-conditioning system in a vehicle configured for autonomous driving and efficiently cools an autonomous driving controller by use of heat-exchanged low temperature coolant.

A cooling system control method for an autonomous driving controller configured for adjusting a temperature of the autonomous driving controller according to various exemplary embodiments of the present invention includes, in a cooling system for the autonomous driving controller, which includes a chiller connected to an air-conditioning system including a compressor, a condenser, an expansion valve, and an evaporator connected to each other by a refrigerant line through a refrigerant connection line, a reservoir tank storing a coolant and connected to the chiller through a coolant pipe, a water pump provided on the coolant pipe between the reservoir tank and the chiller, a sub-expansion valve provided on the refrigerant connection line to selectively expand a refrigerant supplied to the refrigerant connection line, and the autonomous driving controller connected through the coolant pipe between the water pump and the chiller and is controlled by a controller: detecting the temperature of the autonomous driving controller by the controller when a vehicle is driving; determining whether a current temperature of the autonomous driving controller is lower than a target temperature by the controller; and terminating the controlling of the cooling system if the condition is satisfied in determining whether the current temperature of the autonomous driving controller is lower than the target temperature.

In detecting the temperature of the autonomous driving controller by the controller when the vehicle is driving, the controller may detect the current temperature of the autonomous driving controller by an output signal output from a temperature sensor connected to the autonomous driving controller.

In determining whether the current temperature of the autonomous driving controller is lower than the target temperature, if the condition is satisfied, determining whether the air-conditioning system is operated by the controller; operating the water pump if the condition is satisfied in determining whether the air-conditioning system is operated; determining whether the current temperature of the autonomous driving controller is higher than a target temperature controller by the controller; and terminating the controlling of the cooling system if the condition is not satisfied in determining whether the current temperature of the autonomous driving controller is higher than the target temperature, may be further included.

In determining whether the air-conditioning system is operated, if the condition is not satisfied, operating the air-conditioning system and adjusting an opening of the sub-expansion valve by the controller may be further included.

When the operating of the air conditioning device and adjusting of the opening amount of the sub-expansion valve is completed, the controller operates the water pump.

In operating the air-conditioning system and adjusting an opening of the sub-expansion valve by the controller, the sub-expansion valve may expand a refrigerant supplied to the refrigerant connection line to be supplied to the chiller.

In determining whether the current temperature of the autonomous driving controller is higher than the target temperature, if the condition is satisfied, adjusting RPM of the compressor and adjusting the opening of the sub-expansion valve by the controller may be further included.

In adjusting the RPM of the compressor and adjusting the opening of the sub-expansion valve, the controller may increase the RPM of the compressor and increase the opening of the sub-expansion valve.

When the adjusting of the RPM of the compressor and the adjusting of the opening amount of the sub-expansion valve are completed, the controller may return to the step of determining whether the current temperature of the autonomous driving controller is higher than the target temperature.

In operating the water pump by the controller, the coolant supplied from the reservoir tank may be supplied to the autonomous driving controller in the state of being cooled through heat-exchange with the refrigerant in the chiller.

As above-described, according to the cooling system control method for the autonomous driving controller according to the exemplary embodiments of the present invention, it may heat-exchange the refrigerant and the coolant in cooperation with the air-conditioning system in the vehicle configured for autonomous driving and efficiently cool the autonomous driving controller by use of the coolant of the heat-exchanged low temperature.

Also, as the present invention independently cools depending on the cooling requirement of the autonomous driving controller, the autonomous driving controller may be stably cooled and power consumption may be minimized through the independent circuit configuration.

Furthermore, as the present invention secures the cooling performance of the cooling system for the autonomous driving controller, a failure of the autonomous driving controller or an abnormality of the operability may be prevented in advance, ensuring the safety of the driver and pedestrian.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
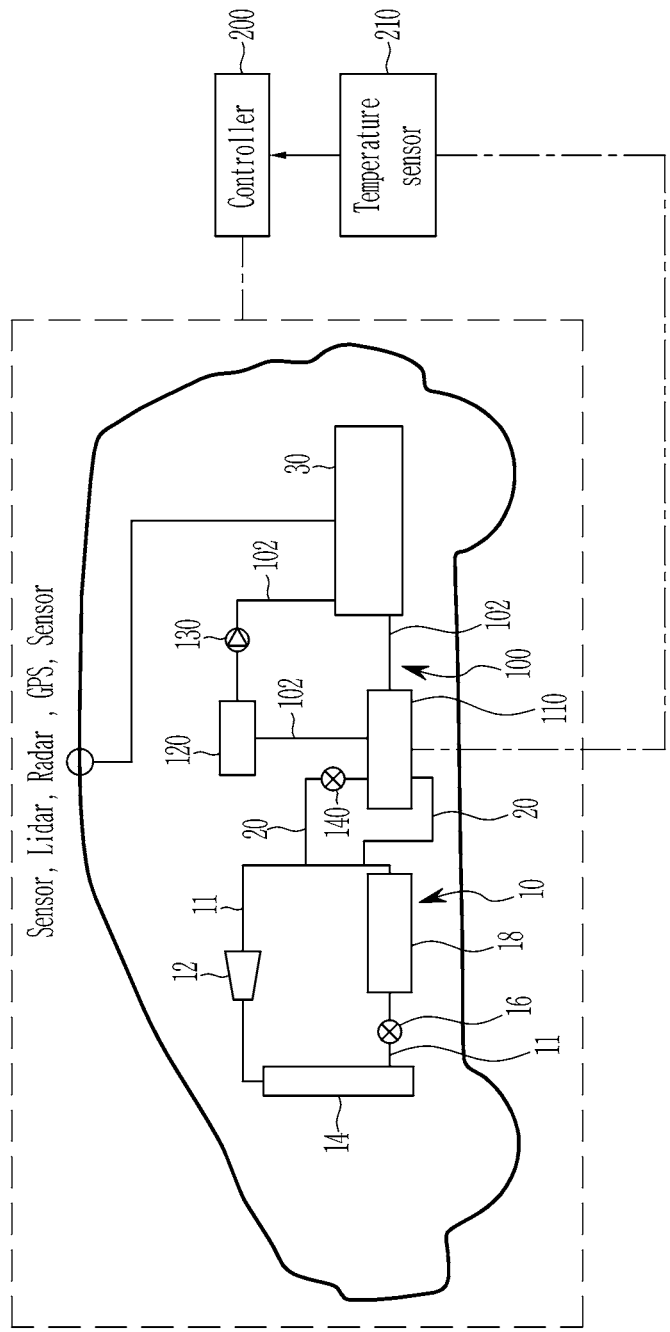
FIG. 1 is a schematic view of a cooling system for an autonomous driving controller according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Exemplary embodiments described in various exemplary embodiments of the present invention and configurations shown in the drawings are just the most preferable exemplary embodiments of the present invention, but do not limit the spirit and scope of the present invention. Therefore, it should be understood that there may be various equivalents and modifications capable of replacing them at the time of filing of the present application.

To clarify the present invention, parts that are not connected with the description will be omitted, and the same elements or equivalents are referred to by the same reference numerals throughout the specification.

The size and thickness of each element are arbitrarily shown in the drawings, and the present invention is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Furthermore, the terms " . . . unit", " . . . mechanism", " . . . portion", " . . . member", etc. used herein mean a unit of inclusive components performing one or more functions or operations.

FIG. 1 is a schematic view of a cooling system for an autonomous driving controller according to various exemplary embodiments of the present invention.

Referring to FIG. 1, a control method of a cooling system for an autonomous driving controller according to various exemplary embodiments of the present invention is applied to an autonomous vehicle.

The vehicle is basically mounted with an air-conditioning system 10 for cooling or heating the vehicle interior.

Here, the air-conditioning system 10 may include a compressor 12, a condenser 14, an expansion valve 16, and an evaporator 18, which are connected by a refrigerant line 11, to cool or heat the vehicle's internal by use of thermal energy generated when the refrigerant changes phase.

The compressor 12 compresses the refrigerant, and the condenser 14 condenses the refrigerant compressed in the compressor 12.

The expansion valve 16 expands the refrigerant condensed in the condenser 14, and the evaporator 18 evaporates the expanded refrigerant.

The evaporator 18 is provided inside a heating, ventilation, and air conditioning (HVAC) module provided in the vehicle.

The vehicle including the air-conditioning system 10 configured as described above is provided with a radar, a Light Detection and Ranging (LiDAR), a GPS (Global Positioning System), and various sensors for the autonomous driving, and an autonomous driving controller 30 for controlling these pieces of equipment is provided.

That is, a cooling system control method for an autonomous driving controller is controlled by a controller 200, and may be applied to a cooling system 100 for an autonomous driving controller interlocked with the air-conditioning system 10.

The controller 200 may be electrically connected to a temperature sensor 210 to confirm the temperature of the autonomous driving controller 30.

The temperature sensor 210 may detect the temperature of the autonomous driving controller 30 to be output to the controller 200.

Here, the cooling system 100 for the autonomous driving controller according to various exemplary embodiments of the present invention includes a chiller 110, a reservoir tank 120, a water pump 130, and a sub-expansion valve 140.

First, the chiller 110 is connected to the air-conditioning system 10 through a refrigerant connection line 20 to inflow the refrigerant circulating in the air-conditioning system 10.

The chiller 110 heat-exchanges the inflowed refrigerant with the coolant supplied from the reservoir tank 120. That is, the chiller 110 may be a water-cooled heat exchanger.

The reservoir tank 120 stores the coolant and is connected to the chiller 110 through a coolant pipe 102.

The water pump 130 is provided on the coolant pipe 102 between the reservoir tank 120 and the chiller 110.

The autonomous driving controller 30 may be provided on the coolant pipe 102 between the water pump 130 and the chiller 110.

That is, the coolant pipe 102 connected to the water pump 130 and the chiller 110 may be connected to the autonomous driving controller 30.

The autonomous driving controller 30 configured as described above includes a water cooling type which is cooled by the coolant inflowed therein.

On the other hand, in the exemplary embodiment of the present invention, the sub-expansion valve 140 is provided in the refrigerant connection line 20, and the refrigerant supplied through the refrigerant line 11 may be selectively expanded to be supplied to the chiller 110. The sub-expansion valve 140 may be configured mechanically or electronically.

In the cooling system 100 for the autonomous driving controller configured as described above, the chiller 110 may selectively supply the coolant to the autonomous driving controller 30 while cooling the coolant supplied from the reservoir tank 130 through heat exchange with the refrigerant to prevent the autonomous driving controller 30 from overheating.

That is, the chiller 110 heat-exchanges the refrigerant supplied with the expanded state from the sub-expansion valve 140 with the coolant supplied from the reservoir tank 120 by the operation of the water pump 130.

The coolant of a low temperature which is cooled through heat exchange with the refrigerant in the chiller 110 may be supplied to the autonomous driving controller 30 by the operation of the water pump 130 to cool the autonomous driving controller 30.

That is, the coolant circulating along the coolant pipe 102 through operation of the water pump 130 is supplied to the autonomous driving controller 30 in the cooled state while passing through the chiller 110, cooling the autonomous driving controller 30.

Accordingly, the autonomous driving controller 30 may be efficiently cooled by the cooling system 100 for the autonomous driving controller.

Hereinafter, the control method of the cooling system 100 according to an autonomous driving controller configured as above is described with reference to FIG. 2.

Figure 2:
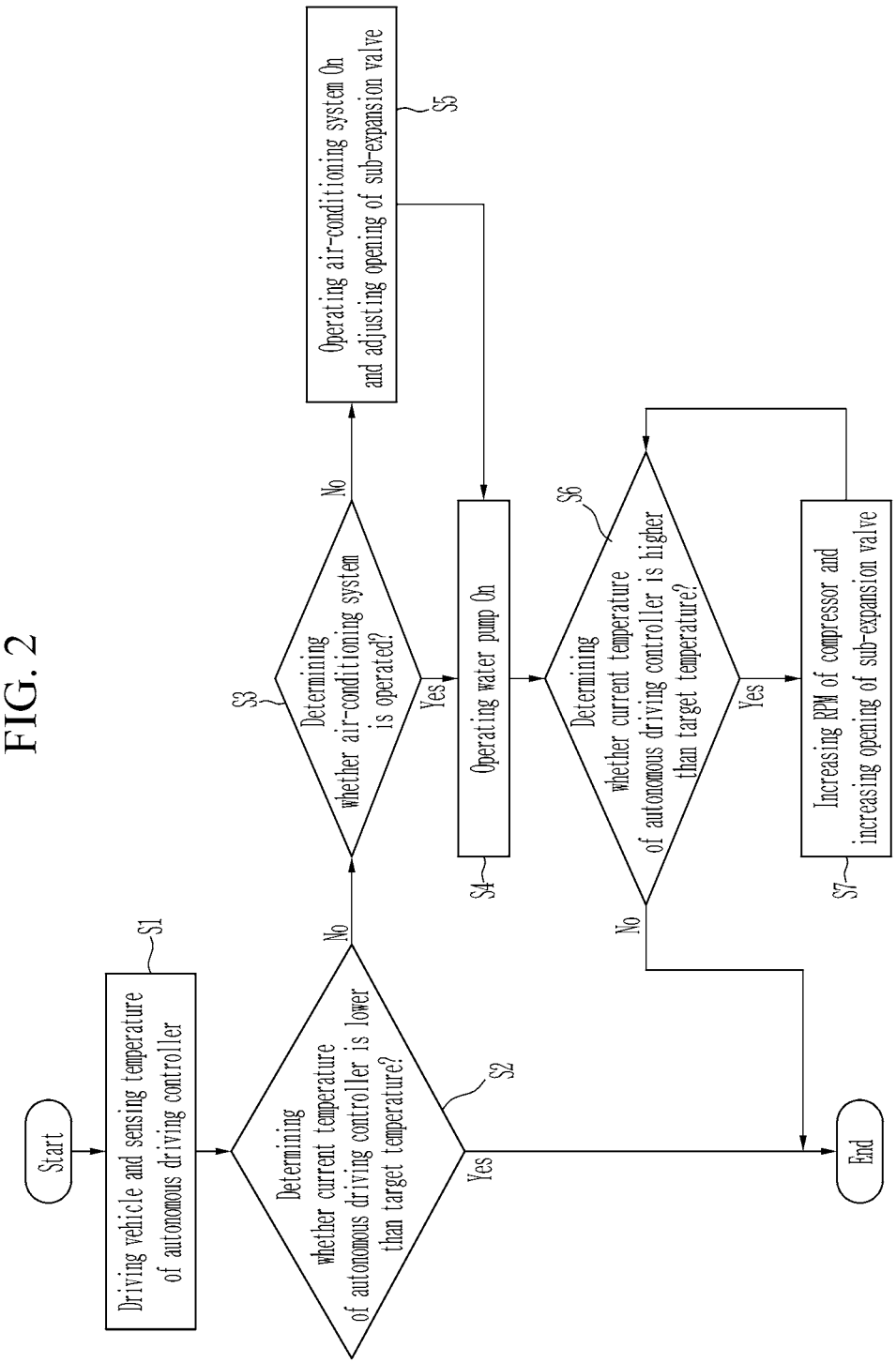
FIG. 2 is a control flowchart to explain a control method of a cooling system for an autonomous driving controller according to various exemplary embodiments of the present invention.

FIG. 2 is a control flowchart to explain a control method of a cooling system for an autonomous driving controller according to various exemplary embodiments of the present invention.

Referring to FIG. 2, the cooling system control method for an autonomous driving controller according to various exemplary embodiments of the present invention is applied for adjusting the temperature of the autonomous driving controller 30.

In the present cooling system control method for the autonomous driving controller, first, when the vehicle is driving, the controller 200 detects the temperature of the autonomous driving controller 30 (S1).

Here, the controller 200 may detect the current temperature of the autonomous driving controller 30 by the output signal output from the temperature sensor 210 connected to the autonomous driving controller 30.

Thereafter, the controller 200 determines whether the current temperature of the autonomous driving controller 30 is lower than a predetermined target temperature of the autonomous driving controller 30 (S2).

In the step (S2) of determining whether the current temperature of the autonomous driving controller 30 is lower than the target temperature, if the condition is satisfied, the control is terminated.

That is, the controller 200 does not operate the cooling system 100 when the current temperature of the autonomous driving controller 30 detected by the temperature sensor 210 is lower than the target temperature of the autonomous driving controller 30 when the vehicle is driving.

On the other hand, in the step (S2) of determining whether the current temperature of the autonomous driving controller 30 is lower than the target temperature, if the condition is not satisfied, the controller 200 determines whether the air-conditioning system 10 is operated (S3).

Here, in the step (S3) of determining whether the air-conditioning system 10 is operated, if the condition is satisfied, the controller 200 operates the water pump 130 (S4).

Accordingly, in the cooling system 100, the coolant stored in the reservoir tank 120 is supplied to the autonomous driving controller 30 along the coolant pipe 102 through the chiller 110.

In the instant case, the coolant passing through the chiller 110 is supplied from the air-conditioning system 10 to the refrigerant connection line 20, expanded by the operation of the sub-expansion valve 140, and cooled while being heat-exchanged with the refrigerant supplied to the chiller 110.

That is, in the step S4 of operating the water pump, the coolant supplied from the reservoir tank 120 may be supplied to the autonomous driving controller 30 in the cooled state through the heat exchange with the refrigerant in the chiller 110.

Accordingly, the coolant cooled in the chiller 110 may efficiently cool the autonomous driving controller 30 while being efficiently supplied to the autonomous driving controller 30.

On the other hand, in the step (S3) of determining whether the air-conditioning system 10 is operated, if the condition is not satisfied, the controller 200 operates the air-conditioning system 10 and adjusts the opening of the sub-expansion valve 140 (S6).

Here, in the step (S6) of operating the air-conditioning system 10 and adjusting the opening of the sub-expansion valve 140, the sub-expansion valve 140 may expand the refrigerant supplied to the refrigerant connection line 20 to be supplied to the chiller 110.

Accordingly, the refrigerant expanded by the operation of the sub-expansion valve 140 is inflowed into the chiller 110.

If the step (S5) of operating the air-conditioning system 10 and adjusting the opening of the sub-expansion valve 140 is completed, the controller 200 may again performed the step (S4) of operating the water pump 130.

Accordingly, the controller 200 determines whether the current temperature of the autonomous driving controller 30 is higher than the target temperature (S6).

In the step (S6) of determining whether the current temperature of the autonomous driving controller 30 is higher than the target temperature, if the condition is not satisfied, the controller 200 may terminate the control.

That is, when the current temperature of the autonomous driving controller 30 is lower than the target temperature, since the cooling of the autonomous driving controller 30 is not required, the controller 200 may stop the operation of the water pump 130 and terminate the control.

On the other hand, in the step S6 of determining whether the current temperature of the autonomous driving controller 30 is higher than the target temperature, if the condition is satisfied, the controller 200 adjusts the RPM of the compressor 12 and adjusts the opening amount of the sub-expansion valve 140 (S7).

Here, the controller 200 may increase the RPM of the compressor 12 and increase the opening of the sub-expansion valve 140.

Accordingly, the flow rate of the refrigerant supplied to the chiller 110 is increased. Accordingly, the temperature of the coolant which undergoes heat transfer with the refrigerant in the chiller 110 may be further lowered.

Accordingly, when the step (S7) of adjusting the RPM of the compressor 12 and adjusting the opening of the sub-expansion valve 140 is completed, the controller 200 may return to the step (S6) of determining whether the current temperature of the autonomous driving controller 30 is higher than the target temperature.

That is, while repeatedly performing the above-described steps, the controller 200 may detect the temperature of the autonomous driving controller 30 in real time while driving the vehicle and may efficiently cool the autonomous driving controller 30 through the operation control of the cooling system 100 and the air-conditioning system 10 according to the current temperature of the autonomous driving controller 30.

Therefore, when the cooling system control method for the autonomous driving controller according to the exemplary embodiments of the present invention configured as described above is applied, it may heat-exchange the refrigerant and the coolant in cooperation with the air-conditioning system 10 in the vehicle configured for autonomous driving and efficiently cool the autonomous driving controller 30 by use of the coolant of the heat-exchanged low temperature.

Also, by independently cooling by use of the refrigerant circulating in the air-conditioning system 10 according to the temperature of the autonomous driving controller 30, the autonomous driving controller 30 may be stably cooled and power consumption may be minimized through the independent circuit configuration.

Furthermore, as the cooling performance of the cooling system 100 for the autonomous driving controller is secured, a failure of the autonomous driving controller 30 or an abnormality of the operability may be prevented in advance, ensuring the safety of the driver and pedestrian.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a cooling system for an autonomous driving controller for adjusting a temperature of the autonomous driving controller, the method comprising:
   in the cooling system including:
      a chiller connected to an air-conditioning system having a compressor, a condenser, an expansion valve, and an evaporator connected to each other by a refrigerant line through a refrigerant connection line;
      a reservoir tank storing a coolant and connected to the chiller through a coolant pipe;
      a pump mounted on the coolant pipe between the reservoir tank and the chiller; and
      a sub-expansion valve mounted on the refrigerant connection line to selectively expand a refrigerant supplied to the refrigerant connection line,
      wherein the autonomous driving controller is connected through the coolant pipe between the pump and the chiller, and wherein the cooling system is controlled by a controller,
   detecting, by the controller, a temperature of the autonomous driving controller upon determining that a vehicle is driving;
   determining, by the controller, whether a current temperature of the autonomous driving controller is lower than a target temperature; and
   controlling of the cooling system according to the current temperature of the autonomous driving controller;
   in determining whether the current temperature of the autonomous driving controller is lower than the target temperature, when the current temperature of the autonomous driving controller is determined to be higher than the target temperature:
      determining, by the controller, whether the air-conditioning system is operated;
      operating the pump when the current temperature of the autonomous driving controller is determined to be higher than the target temperature in determining whether the air-conditioning system is operated;
      determining, by the controller, whether the current temperature of the autonomous driving controller is higher than the target temperature after the pump is operated; and
      terminating the controlling of the cooling system when the current temperature of the autonomous driving controller is determined to be lower than the target temperature; and
   in determining whether the air-conditioning system is operated, when the current temperature of the autonomous driving controller is determined to be higher than the target temperature, operating, by the controller, the air-conditioning system and adjusting an opening of the sub-expansion valve.

2. The method of claim 1, further including terminating the controlling of the cooling system when the current temperature of the autonomous driving controller is determined to be lower than the target temperature.

3. The method of claim 1, wherein, in detecting the temperature of the autonomous driving controller by the controller upon determining that the vehicle is driving, the controller is configured to detect the current temperature of the autonomous driving controller by an output signal output from a temperature sensor connected to the autonomous driving controller.

4. The method of claim 1, wherein, upon determining that the operating of the air conditioning device and the adjusting of the opening amount of the sub-expansion valve are completed, the controller is configured to operate the pump.

5. The method of claim 1, wherein, in operating the air-conditioning system and adjusting the opening of the sub-expansion valve by the controller, the sub-expansion valve expands a refrigerant supplied to the refrigerant connection line to be supplied to the chiller.

6. The method of claim 1, further including:
   in determining whether the current temperature of the autonomous driving controller is higher than the target temperature, when the current temperature of the autonomous driving controller is determined to be higher than the target temperature after the pump is operated,
   adjusting, by the controller, revolutions per minute (RPM) of the compressor and adjusting the opening of the sub-expansion valve.

7. The method of claim 6, wherein, in adjusting the RPM of the compressor and adjusting the opening of the sub-expansion valve, the controller is configured to increase the RPM of the compressor and to increase the opening of the sub-expansion valve.

8. The method of claim 6, wherein, upon determining that the adjusting of the RPM of the compressor and adjusting the opening amount of the sub-expansion valve is completed, the controller is configured to determine whether the current temperature of the autonomous driving controller is higher than the target temperature.

9. The method of claim 1, wherein, in operating the pump by the controller, the coolant supplied from the reservoir tank is supplied to the autonomous driving controller in a state of being cooled through heat exchange with the refrigerant in the chiller.

10. The method of claim 1, wherein the controller includes:
    a processor; and
    a non-transitory storage medium on which a program for performing the method of claim 1 is recorded and executed by the processor.

11. A cooling apparatus comprising:
    an autonomous driving controller;
    a cooling system for the autonomous driving controller for adjusting a temperature of the autonomous driving controller, wherein the cooling system includes:
a chiller connected to an air-conditioning system having a compressor, a condenser, an expansion valve, and an evaporator connected to each other by a refrigerant line through a refrigerant connection line;
a reservoir tank storing a coolant and connected to the chiller through a coolant pipe;
a pump mounted on the coolant pipe between the reservoir tank and the chiller; and
a sub-expansion valve mounted on the refrigerant connection line to selectively expand a refrigerant supplied to the refrigerant connection line, wherein the autonomous driving controller is connected through the coolant pipe between the pump and the chiller;
a temperature sensor to detect a temperature of the autonomous driving controller; and
a controller connected to the temperature sensor and configured for controlling the cooling system and performing:
detecting the temperature of the autonomous driving controller via the temperature sensor upon determining that a vehicle is driving;
determining whether a current temperature of the autonomous driving controller is lower than a target temperature; and
controlling of the cooling system according to the current temperature of the autonomous driving controller,
wherein, in determining whether the current temperature of the autonomous driving controller is lower than the target temperature, when the current temperature of the autonomous driving controller is determined to be lower than the target temperature, the controller is configured of:
determining whether the air-conditioning system is operated;
operating the pump when the current temperature of the autonomous driving controller is determined to be higher than the target temperature in determining whether the air-conditioning system is operated;
determining whether the current temperature of the autonomous driving controller is higher than the target temperature after the pump is operated; and
terminating the controlling of the cooling system when the current temperature of the autonomous driving controller is determined to be lower than the target temperature, and
wherein, in determining whether the air-conditioning system is operated, when the current temperature of the autonomous driving controller is determined to be higher than the target temperature, the controller is configured of operating the air-conditioning system and adjusting an opening of the sub-expansion valve.

12. The cooling apparatus of claim 11, wherein the controller is configured for terminating the controlling of the cooling system when the current temperature of the autonomous driving controller is determined to be lower than the target temperature.

13. The cooling apparatus of claim 11, wherein, upon determining that the operating of the air conditioning device and the adjusting of the opening amount of the sub-expansion valve are completed, the controller is configured to operate the pump.

14. The cooling apparatus of claim 13, wherein, upon determining that the adjusting of the RPM of the compressor and adjusting the opening amount of the sub-expansion valve is completed, the controller is configured to determine whether the current temperature of the autonomous driving controller is higher than the target temperature.

15. The cooling apparatus of claim 11, wherein, in determining whether the current temperature of the autonomous driving controller is higher than the target temperature, when the current temperature of the autonomous driving controller is determined to be higher than the target temperature after the pump is operated,
the controller is configured of adjusting revolutions per minute (RPM) of the compressor and adjusting the opening of the sub-expansion valve.

* * * * *